United States Patent
Alberts et al.

(10) Patent No.: US 12,286,961 B2
(45) Date of Patent: Apr. 29, 2025

(54) CONTROLLING OFFSHORE WIND TURBINES REGARDING A DAMPING ACTION

(71) Applicant: Siemens Gamesa Renewable Energy A/S, Brande (DK)

(72) Inventors: Johannes Gerhardes Wardjan Alberts, Brøndby Strand (DK); Safak Burak Altun, Harlev J (DK); Carlo Tibaldi, København (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/691,671

(22) PCT Filed: Sep. 12, 2022

(86) PCT No.: PCT/EP2022/075222
§ 371 (c)(1),
(2) Date: Mar. 13, 2024

(87) PCT Pub. No.: WO2023/046507
PCT Pub. Date: Mar. 30, 2023

(65) Prior Publication Data
US 2024/0401566 A1 Dec. 5, 2024

(30) Foreign Application Priority Data
Sep. 24, 2021 (EP) .................................. 21198754

(51) Int. Cl.
*F03D 7/04* (2006.01)
*F03D 9/00* (2016.01)

(52) U.S. Cl.
CPC ............. *F03D 7/048* (2013.01); *F03D 9/008* (2013.01); *F05B 2270/32* (2013.01);
(Continued)

(58) Field of Classification Search
CPC ............... F03D 7/048; F05B 2270/342; F05B 2270/321; F05B 2270/329
See application file for complete search history.

(56) References Cited

U.S. PATENT DOCUMENTS

| | | | |
|---|---|---|---|
| 8,169,098 B2 * | 5/2012 | Scholte-Wassink | .... F03D 7/042 290/55 |
| 8,174,137 B2 * | 5/2012 | Skaare | .................. F03D 7/0224 416/7 |

(Continued)

FOREIGN PATENT DOCUMENTS

| | | |
|---|---|---|
| EP | 2054620 A1 | 5/2009 |
| EP | 2469083 A2 | 6/2012 |

(Continued)

OTHER PUBLICATIONS

PCT International Search Report and Written Opinion of International Searching Authority mailed Dec. 6, 2022 corresponding to PCT International Application No. PCT/EP2022/075222 filed Sep. 12, 2022.

*Primary Examiner* — Eldon T Brockman
(74) *Attorney, Agent, or Firm* — Schmeiser, Olsen & Watts LLP

(57) ABSTRACT

A method of controlling plural offshore wind turbines regarding a mechanical oscillation damping action is provided, the method including: obtaining wave characteristic information indicating a characteristic of at least one sea wave; obtaining wind turbine operational state information of the plural wind turbines; obtaining wind characteristic information; controlling the wind turbines regarding the damping action based on the wave characteristic information and/or the wind turbine operational state information of the plural wind turbines and/or the wind characteristic informa-
(Continued)

tion in particular such that a power oscillation of a total power output of the wind park is reduced.

11 Claims, 1 Drawing Sheet

(52) U.S. Cl.
CPC ... *F05B 2270/321* (2013.01); *F05B 2270/329* (2013.01); *F05B 2270/342* (2020.08)

(56) References Cited

U.S. PATENT DOCUMENTS

| | | | |
|---|---|---|---|
| 11,300,101 B2* | 4/2022 | Hovgaard | ............... F03D 9/007 |
| 2019/0383265 A1* | 12/2019 | Hovgaard | ............... F03D 9/007 |

FOREIGN PATENT DOCUMENTS

| | | |
|---|---|---|
| EP | 3581791 A1 | 12/2019 |
| EP | 3779183 A1 | 2/2021 |
| WO | 2022214261 A1 | 10/2022 |

\* cited by examiner

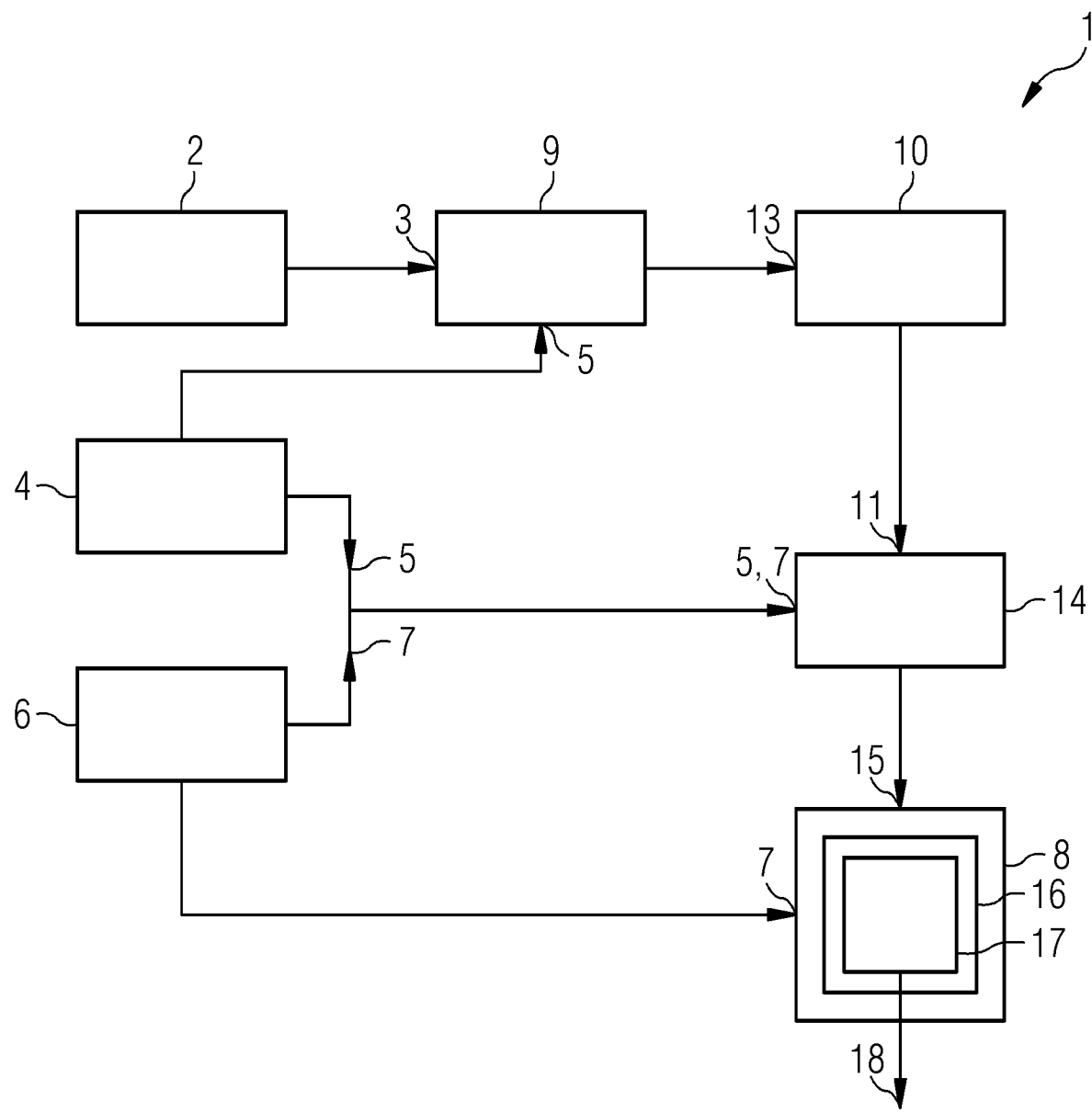

CONTROLLING OFFSHORE WIND TURBINES REGARDING A DAMPING ACTION

CROSS-REFERENCE TO RELATED APPLICATIONS

This application claims priority to PCT Application No. PCT/EP2022/075222, having a filing date of Sep. 12, 2022, which claims priority to EP Application No. 21198754.0, having a filing date of Sep. 24, 2021, the entire contents both of which are hereby incorporated by reference.

FIELD OF TECHNOLOGY

The following relates to a method and to an arrangement of controlling plural offshore wind turbines (e.g., of a wind park) regarding a mechanical oscillation damping action. Further, the following relates to an offshore wind park comprising the arrangement.

BACKGROUND

Offshore wind turbines of an offshore wind park are exposed to environmental influences, in particular sea waves. The sea waves may excite or induce vibrations or oscillations on components of the wind turbine, in particular vibrations on the tower and/or foundation of the wind turbines. Also floating offshore wind turbines are affected by sea waves also inducing vibrations or oscillations on the tower or the system comprising the tower and the platform or other components of the wind turbine.

These vibrations or oscillations are conventionally damped by hardware and/or active tower damper (ATD) at each individual wind turbine. The active tower damper is a control functionality that dampens the tower and/or foundation vibrations by changing the power reference, thereby torque acting on the generator or acting on the entire wind turbine. Although this conventional controller functionality helps to reduce vibrations at individual wind turbines, on some occasions, multiple wind turbines result in power oscillations with large amplitudes in the wind farm power output. When this happens at a frequency range where the grid is vulnerable, it might lead to instabilities.

It has been observed that conventionally produced large output oscillations are supplied to the grid leading to problems of the stability of the utility grid.

Thus, there may be a need for a method and a corresponding arrangement of controlling plural offshore wind turbines regarding a mechanical oscillation damping action, wherein utility grid stability may be maintained or improved and wherein in particular power output oscillations of the entire wind park are reduced compared to conventional systems. Furthermore, there may be a need for a respective method or arrangement of controlling plural offshore wind turbines, wherein alternatively or additionally, mechanical oscillations of one or more components of the wind turbine are effectively damped, while simultaneously, grid stability may be improved or maintained.

SUMMARY

An aspect relates to a method of controlling plural offshore wind turbines (e.g., of a wind park) regarding a mechanical oscillation damping action, the method comprising obtaining wave characteristic information indicating a characteristic of at least one sea wave (around the wind park); obtaining wind turbine operational state information of the plural wind turbines, in particular including wind turbine yaw direction information; (optionally) obtaining wind characteristic information; controlling the wind turbines regarding the damping action based on the wave characteristic information and/or the wind turbine operational state information of the plural wind turbines and/or the wind characteristic information in particular such that a power oscillation of a total power output of the wind park is reduced.

In embodiments, the method may for example be performed by a wind park controller or wind park pilot or may be performed by a utility grid operator, at least in part. The offshore (floating or fixed foundation) wind turbines may be installed at individual foundations or platforms in the sea. In embodiments, the method may consider the layout or design or architecture of the wind park regarding the individual locations of the wind turbines.

The mechanical oscillation damping action may be performed by each of the individual wind turbines, in order to dampen at least one mechanical oscillation of this respective wind turbine. Embodiments of the present invention are in particular directed to dampen tower oscillations, in particular oscillation modes of tower oscillations, such as side-side oscillations and/or fore-aft oscillations of the tower. Other embodiments are directed for considering also damping vibrations of the system comprising the foundation or the floating platform of the wind turbine together with the wind turbine itself, including the tower, the nacelle and the rotor blades.

Embodiments of the present invention may not require to measure actual mechanical oscillation of each of the individual wind turbines. Instead, the excitation of the oscillation as caused by the sea waves may be estimated using for example a physical/mathematical model which may for example be implemented using at least one look-up table. The look-up table may receive or the model may receive the wave characteristic information and/or the wind turbine operational state information and/or the wind characteristic information and may output based on those input quantities control parameters for the wind turbines, in particular individual wind turbine power references which may also comprise a damping power component for each of the individual wind turbines, as will be explained below. The wind turbines may be controlled in order to at least partly dampen the mechanical oscillation and furthermore in order to keep power oscillations at the output of the entire wind park in acceptable limits, in order to ensure grid stability.

The wave characteristic information may for example be obtained from one or more sensors or sensing devices, for example installed at buoys or also installed at one or more platforms or foundations of one or more wind turbines.

The wind turbine operational state information may be obtained from sensing devices installed at each individual wind turbine. Those sensing devices may be conventionally installed.

The wind characteristic information may be obtained for example from a weather station, from one or more wind speed and/or wind direction sensors, which may be arranged at one or more locations, for example at one or more wind turbines or one or more buoys or masts.

When the wave characteristic information, the wind turbine operational state information as well as the wind characteristic information is considered in combination, an expected oscillation or excitation of an oscillation may be determined for each of the individual wind turbines in an effective and accurate manner. Furthermore, a characteristic of a damping power component for each of the wind turbines needed in order to dampen the oscillation may be estimated or determined. When the plural damping power components are considered, furthermore, the combined effect of the damping actions performed by the plural wind turbines may be estimated and potential power oscillations of the power output of the entire wind park may be estimated. Based on this estimation, the respective damping power components may then be adapted in order to reduce the power oscillations at the output terminal of the wind park.

According to an embodiment of the present invention, the method further comprises estimating, for each of the wind turbines, an (wind turbine specific) oscillation excitation characteristic of at least one mechanical oscillation related to the respective wind turbine, based on the wave characteristic information, the wind turbine operational state information of the plural wind turbines and the wind characteristic information.

The oscillation excitation characteristic may enable to estimate which oscillations at each of the individual wind turbines are expected to be excited by the sea wave and when, in particular regarding the phase, those oscillations will be excited and also to which degree or to which amplitude those oscillations are expected to be excited. In turn, based on the oscillation excitation characteristic, the respective damping power component may be estimated in order to dampen an oscillation as excited by the estimated oscillation excitation characteristic. In embodiments, the method may for example comprise to estimate which of the wind turbines will be excited by a particular sea wave at a same time or which will be excited at different times. In embodiments, the method may further comprise to estimate the phase (and/or time) difference between the excitations of different wind turbines.

According to an embodiment of the present invention, estimating the oscillation excitation characteristic comprises to determine when the individual wind turbines are hit by the sea wave thereby considering locations of the wind turbines and wave travel times.

The wave characteristic information may for example include information regarding the wave direction, height and/or frequency. Using the information regarding the layout or the design of the wind park and considering the propagation time of the wave along the known direction, it may be calculated when the respective wave hits which wind turbine. Based on the estimated hitting times, the excitation of the oscillation may be estimated. In particular, when also considering the azimuthal angle for example of the rotor (including information regarding the angle positions of the individual rotor blades), the kind of oscillation and the phase of the oscillation and the amplitude of the oscillation which may be caused by the hitting sea wave may be determined or estimated. This may be performed for each of the individual wind turbines. Thereby, controlling the plural wind turbines regarding appropriate damping actions, while at the same time minimizing total power output fluctuations may be improved.

According to an embodiment of the present invention, the method further comprises estimating (e.g., for each of the wind turbines), based on the wave characteristic information and/or the wind turbine operational state information and/or the wind characteristic information and/or based on the oscillation excitation characteristic: a (wind turbine specific) characteristic of a damping power component to be added to a wind turbine power reference, in order to dampen at least one mechanical oscillation related to the respective wind turbine.

The characteristic of the damping power component for each of the individual wind turbines may define how the power output (and/or torque) of the wind turbine needs to be modulated in order to optimally dampen the oscillation of the wind turbine or the wind turbine tower or the system including the tower and the foundation or any of the wind turbine components. However, this optimal damping action may in combination of plural wind turbines lead to excessive power output oscillations of the entire wind park. Thus, embodiments of the present invention may later on adapt the characteristic of the damping power component in order to keep power oscillations of the entire wind park in acceptable limits or even avoid power oscillations.

The wind turbine power reference may be supplied or defined for example by a park control module or may be defined by a grid operator. The wind turbine power reference may substantially be constant. In particular, the method may be performed during operational times of the wind turbines, wherein no transitions between different operational modes are present. While the wind turbine power reference may be substantially constant, the damping power component may be an oscillatory component oscillating according to a sine or a cosine or in general to a trigonometrical function having a frequency of the oscillation to be damped. The damping power component may be defined to counteract any oscillation of the wind turbine component. The characteristic of the damping power component may be estimated based on the aforementioned input data, in particular the wave characteristic information, the wind turbine operational state information and the wind characteristic information, without requiring to measure the actual oscillations at each of the wind turbines. In embodiments, the method may be simplified, and communication needs may be decreased.

According to an embodiment of the present invention, the method further comprises determining a total damping control related power output or a total power output of the wind farm based on the estimated damping power components of the wind turbines; adapting the characteristic of the damping power component for each of the wind turbines such that a power oscillation of a total power output of the wind farm is reduced.

The total damping control related power output may be the sum of the individual damping power components of all wind turbines. The total power output of the wind farm may be the sum of the damping power components of all wind turbines to which the sum of the individual wind turbine power references is added. The total damping control related power output may comprise power oscillations which are undesirable, since they may lead to utility grid instabilities. Therefore, the characteristic of the damping power component for each of the wind turbines may be adapted, in order to keep oscillations or modulations of the total damping control related power output or the total power output in acceptable limits. Adapting the characteristic of the damping power component for each of the wind turbines may deteriorate to a particular degree the damping effect for damping the mechanical oscillation. However, thereby, excessive oscillations at the output of the entire wind park may be decreased.

According to an embodiment of the present invention, controlling the wind turbines comprises controlling the wind turbines according to the adapted characteristic of the damping power, in particular by supplying, for each wind turbine, a control signal as a sum of the wind turbine power reference and a damping signal defined by the adapted characteristic of the damping power components for the individual wind turbine.

When the wind turbines are controlled according to the adapted characteristic of the damping power, there may be a sufficient damping of the mechanical oscillation, while simultaneously, power oscillations at the output of the entire wind park may be decreased or may kept in acceptable limits.

According to an embodiment of the present invention, estimating the (wind turbine specific) characteristic of a damping power component comprises considering locations of the wind turbines and wave travel times, in particular in order to estimate points in time when the individual wind turbines are hit by the wave.

Furthermore, by considering for example the azimuthal position of the rotor, the locations of the individual wind turbines, the wave travel times, it may be enabled to estimate or determine for each of the individual wind turbines the characteristic of the damping power component, which would cause damping of the mechanical oscillation.

According to an embodiment of the present invention, adapting the characteristic of the damping power component comprises at least one of: adapting, in particular decreasing, an amplitude of the damping power component; adapting a phase of the damping power component.

The damping power component may be characterized by an amplitude, by a frequency and also by a phase. The frequency of the damping power component may be determined or may be defined by the particular frequency of the oscillation which is desired to be damped. The frequency of the damping power component may be kept unchanged, i.e., may not be adapted according to an embodiment of the present invention. However, by adapting the amplitude and/or the phase of the damping power component, the amplitude and also the frequency of potential power fluctuations at the output of the entire wind park may be changed or adapted, to be in acceptable limits. For example, by adapting the phase of the damping power component of different wind turbines, the respective damping power components may destructively interfere with each other, thereby reducing the power oscillations at the output of the entire wind park. Also decreasing the amplitude of the damping power component of one or more of the wind turbines may decrease the power fluctuations at the wind park output terminal.

According to an embodiment of the present invention, the wave characteristic information comprises at least one of: a propagation direction of the wave; a frequency of the wave; a wavelength of the wave; a height or an amplitude of the wave; a speed of the wave.

Thereby, estimation of the oscillations at the individual wind turbines may be enabled and estimations of the individual damping power components. For example, the frequency of the wave may indicate which of the possible vibration or oscillation modes of the system including the wind turbine may be excited. The height or the amplitude of the wave may indicate to what degree or to which amplitude the respective mechanical oscillation may be excited.

According to an embodiment of the present invention, the wind turbine operational state information comprises at least one of: information about any operating parameter; a rotational speed of the rotor at which plural rotor blades are mounted; an azimuthal angle of the rotor; a yawing angle of a nacelle; an active and/or reactive power output of the wind turbine; a location of the wind turbine.

The operating parameter may relate to an electrical and/or mechanical operating parameter. The azimuthal angle of the rotor may indicate the angle position of the plural rotor blades which are connected to the rotor. The yawing angle of the nacelle may indicate the direction of the rotation axis around which the rotor rotates. Considering one or more of those parameters or quantities may enable to appropriately control the plural wind turbines.

According to an embodiment of the present invention, the wind characteristic information comprises at least one of: a wind direction information; a wind speed information; wherein the wind characteristic information relates to a free wind characteristic.

According to embodiments of the present invention, the wind characteristic information may not be required to control the wind turbines for reducing power oscillations at the wind park output terminal. Primarily, the wind turbine mechanical oscillation may be excited by the prevailing sea waves. In other embodiments, the wind characteristic information is also considered for controlling the wind turbines in an even improved manner to avoid excessive power output fluctuations at the wind park output terminal. The wind characteristics information may be used to determine the direction of damping from rotor rotation (e.g., fore aft). If the wind and wave directions are aligned, required damping power may be less compared to when they are misaligned. Knowing the wind direction, the required damping power can be determined or limited independent from the park requirements ensuring a good level of damping for most of the times.

According to an embodiment of the present invention, the offshore wind turbines comprise floating offshore wind turbines and/or fixed foundation offshore wind turbines, and/or wherein the mechanical oscillation comprises at least one of: a tower oscillation; a foundation oscillation; an oscillation of a system comprising the wind turbine and the foundation; an oscillation of at least one wind turbine component. Thereby, conventional oscillations which have been observed, may be supported by embodiments of the present invention.

According to an embodiment of the present invention, the method is performed during one of: a normal operation; a curtailed operation; a stand by operation; wherein the wind turbine power reference is substantially constant. In embodiments, the method may in particular be performed, when no transition from one operation to another operational mode occurs. In particular, when a transition from a normal operation to a curtailed operation or back from a curtailed operation to a normal operation is performed, there may be an additional excitation source for exciting additional oscillations which are not related or not excited by sea waves. Those excitations might require other control measures which may not be addressed here primarily.

It should be understood that features, individually or in any combination, disclosed, described, applied, or mentioned with respect to a method of controlling plural offshore wind turbines regarding a mechanical oscillation, may also, individually or in any combination, apply to an arrangement for controlling plural offshore wind turbines regarding a mechanical oscillation damping action, according to embodiments of the present invention and vice versa.

According to an embodiment of the present invention it is provided an arrangement for controlling plural offshore wind turbines (of a wind park) regarding a mechanical oscillation damping action, the arrangement comprising: an input module adapted to obtain wave characteristic information indicating characteristic of at least one sea wave (around the wind park); to obtain wind turbine operational state information of the plural wind turbines; to obtain wind characteristic information; a processing module adapted to generate control signals for the wind turbines regarding the damping action based on the wave characteristic information, the wind turbine operational state information of the plural wind turbines and the wind characteristic information.

The arrangement may be implemented in software and/or hardware. In embodiments, the method may be implemented in software and/or hardware. The arrangement may for example be a module of a wind park controller. The arrangement may communicatively be connected or connectable to the plural wind turbines. According to an embodiment of the present invention, the arrangement may further comprise one or more sensors which are adapted to measure the wind characteristic information and/or to measure the wind turbine operational state and/or to measure the wind characteristic information. The one or more sensors may be distributed across the wind turbines or across one or more buoys or one or more masts. The control signals may in particular comprise power references regarding active power output of each of the individual wind turbines.

According to an embodiment of the present invention it is provided an offshore wind park, comprising: plural offshore wind turbines; and an arrangement according to the preceding embodiment communicatively connectable to the wind turbines.

The aspects defined above, and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with references to the following FIGURES, wherein like designations denote like members, wherein:

The FIGURE illustrates a flow diagram of a method of controlling plural offshore wind turbines according to an embodiment of the present invention.

DETAILED DESCRIPTION

In embodiments, the method scheme 1 in the FIGURE schematically illustrates a method of controlling plural offshore wind turbines regarding a mechanical oscillation damping action according to an embodiment of the present invention. In a method block 2, wave characteristic information 3 is obtained which indicate a characteristic of at least one sea wave (for example as measured at one or more measurement locations around the wind park). The wave characteristic information 3 may for example comprise information regarding wave direction, wave height, wave frequency and/or wave wavelength.

In a method block 4, wind turbine operational state information 5 is obtained which pertain to the operational state of the plural wind turbines of the wind park. In a method block 5, wind characteristic information 7 is obtained. The wind characteristic information 7 may for example comprise information regarding wind speed and/or wind direction, for example as measured by one or more of the wind turbines or may be located at different measurement stations.

An optimization module 8 is configured to control the wind turbines regarding the damping action based on the wave characteristic information 3 and/or the wind turbine operational state information 5 and/or the wind characteristic information 7.

In a method block 9, downstream turbines are identified based on the sea wave characteristic 3. In particular, in the method block 9, those wind turbines may be identified which will be hit by the same sea wave at different or same hitting times. The hitting times may be an example of an oscillation excitation characteristic of the at least one mechanical oscillation. In embodiments, the method block 9 outputs identified downstream wind turbines which are labelled with reference sign 13 or information regarding downstream wind turbines with respect to an incoming sea wave.

In a method block 10 the wind turbines are identified which are hit by the sea waves at the same time by calculating the travel time using distance between the turbines and wave characteristics 3. Also this method block 10 relates to an estimation of an oscillation excitation characteristic which is then collectively labelled with reference sign 11. Thus, the oscillation excitation characteristic comprises according to method block 10 to determine when the individual wind turbines are hit by the sea wave thereby considering the locations of the wind turbines and the wave travel times.

At a method block 14 which may be a method step which is applied at each individual wind turbine, a respective characteristic of a damping power component 15 to be added to a wind turbine power reference is estimated, wherein the characteristic 15 of the damping power component is calculated for each of the wind turbines of the wind park. Thereby, the characteristic of the damping power component indicates how much tower damper power needs to be injected into the power reference in order to dampen the tower vibrations caused by the sea waves, in particular specific for each of the plural wind turbines.

The optimizer method step 8 receives the characteristic 15 of the damping power component for each of the plural wind turbines and performs a farm power output optimization to reduce oscillations due to tower damper actions during for example a normal operation or a curtailed operation. In embodiments, the method block 8 may determine a total damping control related power output or a total power output of the wind farm based on the estimated damping power components 15 of the individual wind turbines. The optimization may be performed in a method sub-step 16.

In order to perform the optimization, an adaptation step 17 is performed, wherein the characteristic of the damping power component for each of the wind turbines is adapted, such that a power oscillation of a total power output of the wind farm is reduced. The adapted characteristic of the damping power is output by the method step 17 and labelled with reference sign 18. For example, in the adaptation step 17, a phase-shift of the tower damper power reference and/or a limit of the maximum allowed tower damper power injected into the turbine power reference of the individual wind turbines may be performed, in order to minimize the oscillations in the wind farm power output. Thus, adaption of the characteristic 15 of the damping power component may include to for example adapt, in particular decrease, an amplitude of the damping power component and/or to adapt a phase of the damping power component.

In embodiments, the method step 8 may for example be performed by a wind farm controller, in particular an optimizer module. Thereby, the wind farm controller may optimize the active tower damper behaviour at each turbine by using the operational and environmental information from all turbines of the wind park. Thereby, the wind farm controller may utilize the turbine and the park operational states (for example whether it is nominal power production, turbines stopped or starting up), wind measurements (for example wind speed and/or wind direction and/or wind frequency) from all wind turbines as well as sea wave information (for example wave direction, wave frequency, wave speed). This information may be retrieved from a) sea wave estimator that runs at individual turbines
b) a nearby buoy (for example, to the farm)
c) weather or ocean forecasts.

By using the operational state and wind measurements or wind characteristic information from the wind turbines along the sea wave estimation/measurements from above sources, the wind farm controller may compute the likelihood of the turbines running controller functionalities with an influence on the farm power output in phase.

The wind farm controller may combine the above information, i.e., the wave characteristic information 3, the wind turbine operational state information 5 and the wind characteristic information 7, in order to reduce the maximum active tower damper power, gain and/or shift its phase temporarily at turbines that are likely to run in phase to reduce the oscillations in the wind farm power output. In embodiments, the method step 14 may be performed at each individual wind turbine. In embodiments, the method step 8 may be performed by a wind park controller for example. In embodiments, the method steps 2, 4, 6 may be performed by one or more measurement sensors.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling plural offshore wind turbines of a wind park regarding a mechanical oscillation damping action, the method comprising:
   obtaining wave characteristic information indicating a characteristic of at least one sea wave;
   obtaining wind turbine operational state information of the plural wind turbines, including wind turbine yaw direction information;
   obtaining wind characteristic information; and
   controlling the wind turbines regarding the damping action based on the wave characteristic information and/or the wind turbine operational state information of the plural wind turbines and/or the wind characteristic information, such that a power oscillation of a total power output of the wind park is reduced;
   the method further comprising estimating, based on the wave characteristic information and/or the wind turbine operational state information and/or the wind characteristic information and/or based on an oscillation excitation characteristic, a characteristic of a damping power component to be added to a wind turbine power reference, to dampen at least one mechanical oscillation related to the respective wind turbine; and
   wherein the method further comprises:
   wherein estimating the characteristic of a damping power component includes considering locations of the wind turbines and wave travel times, to estimate points in time when the individual wind turbines are hit by the wave; and/or
   determining a total damping control related power output or a total power output of the wind farm based on the estimated damping power components of the wind turbines, and configuring the characteristic of the damping power component for each of the wind turbines such that the power oscillation of the total power output of the wind farm is reduced, wherein controlling the wind turbines comprises controlling the wind turbines according to the configured characteristic of the damping power, by supplying, for each wind turbine, a control signal as a sum of the wind turbine power reference and a damping signal defined by the configured characteristic of the damping power components for the individual wind turbine.

2. The method according to claim 1, further comprising:
   estimating, for each of the wind turbines, the oscillation excitation characteristic of at least one mechanical oscillation related to the respective wind turbine, based on the wave characteristic information, the wind turbine operational state information of the plural wind turbines and the wind characteristic information.

3. The method according to claim 2, wherein estimating the oscillation excitation characteristic comprises to determine when the individual wind turbines are hit by the sea wave thereby considering locations of the wind turbines and wave travel times.

4. The method according to claim 1, wherein configuring the characteristic of the damping power component comprises:
   configuring an amplitude of the damping power component; and/or
   configuring a phase of the damping power component.

5. The method according to claim 1, wherein the wave characteristic information comprises:
   a propagation direction of the wave;
   a frequency of the wave;
   a wavelength of the wave;
   a length of the wave;
   a height or an amplitude of the wave; and/or
   a speed of the wave.

6. The method according to claim 1, wherein the wind turbine operational state information comprises:
   information about any operating parameter;
   a rotational speed of the rotor at which plural rotor blades are mounted;
   an azimuthal angle of the rotor;
   a yawing angle of a nacelle;
   an active and/or reactive power output of the wind turbine; and/or
   a location of the wind turbine.

7. The method according to claim 1, wherein the wind characteristic information comprises:
   a wind direction information;
   a wind speed information; and/or wherein the wind characteristic information relates to a free wind characteristic.

8. The method according to claim 1,
   wherein the offshore wind turbines comprise floating offshore wind turbines and/or fixed foundation offshore wind turbines, and/or
   wherein the mechanical oscillation comprises at least one of:
   a tower oscillation;
   a foundation oscillation;
   an oscillation of a system comprising the wind turbine and the foundation; and
   an oscillation of at least one wind turbine component.

9. The method according to claim 1, wherein the method is performed during one of:

a normal operation;
a curtailed operation;
a stand by operation; and wherein the wind turbine power reference is substantially constant.

10. An arrangement for controlling plural offshore wind turbines of a wind park regarding a mechanical oscillation damping action, the arrangement comprising:
an input module configured:
to obtain wave characteristic information indicating a characteristic of at least one sea wave;
to obtain wind turbine operational state information of the plural wind turbines;
to obtain wind characteristic information; and
a processing module configured to generate control signals for the wind turbines regarding the damping action based on the wave characteristic information and/or the wind turbine operational state information of the plural wind turbines and/or the wind characteristic information, such that a power oscillation of a total power output of the wind park is reduced.

11. An offshore wind park, comprising:
plural offshore wind turbines; and the arrangement according to claim 10 communicatively connectable to the wind turbines.

\* \* \* \* \*